US012606387B2

(12) United States Patent     (10) Patent No.:   US 12,606,387 B2

Ozimek et al.     (45) Date of Patent:     Apr. 21, 2026

(54) SYSTEM AND METHOD FOR ACHIEVING POSITION DETECTION INTEGRITY IN AN INDEPENDENT CART SYSTEM

(71) Applicant: Rockwell Automation Technologies, Inc., Mayfield Heights, OH (US)

(72) Inventors: Patrick E. Ozimek, Elm Grove, WI (US); Yuhong Huang, Acton, MA (US); David W. Demers, Brookfield, WI (US); Brian M. Perreault, Stow, MA (US); Daniel I. Lanier, North Billerica, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 792 days.

(21) Appl. No.: 17/956,462

(22) Filed: Sep. 29, 2022

(65) Prior Publication Data

US 2024/0109735 A1     Apr. 4, 2024

(51) Int. Cl.
| | |
|---|---|
| B65G 54/02 | (2006.01) |
| B60L 13/03 | (2006.01) |
| B60L 13/10 | (2006.01) |

(52) U.S. Cl.
CPC .............. B65G 54/02 (2013.01); B60L 13/03 (2013.01); B60L 13/10 (2013.01); *B60L 2200/26* (2013.01); *B65G 2203/0283* (2013.01)

(58) Field of Classification Search
CPC ...... B60L 13/03; B60L 13/10; B60L 2200/26; B65G 54/02; B65G 2203/0283
See application file for complete search history.

(56) References Cited

U.S. PATENT DOCUMENTS

| | | | |
|---|---|---|---|
| 10,562,715 | B2 | 2/2020 | Huang |
| 10,620,014 | B2 | 4/2020 | Smit et al. |
| 11,186,302 | B2 | 11/2021 | Desotelle et al. |
| 2003/0230941 | A1 | 12/2003 | Jacobs |
| 2020/0166389 | A1 | 5/2020 | Huang |

FOREIGN PATENT DOCUMENTS

| | | | | |
|---|---|---|---|---|
| EP | 2746732 A1 | * | 6/2014 | ......... G01D 5/24466 |
| WO | WO-2022144431 A2 | * | 7/2022 | ............. B65G 54/02 |

OTHER PUBLICATIONS

Extended European Search Report for Application No. 23198256.2 dated Feb. 23, 2024 (9 pages).

* cited by examiner

*Primary Examiner* — Robert J McCarry, Jr.
(74) *Attorney, Agent, or Firm* — Boyle Fredrickson, S.C.

(57) ABSTRACT

A system and method for detecting integrity of a position for a mover in an independent cart system, includes receiving multiple first position feedback signals at a first processing core and receiving multiple second position feedback signals at a second processing core. Each of the first and second position feedback signals are generated by first and second position sensors, respectively, by detecting a magnet array mounted on the mover. A first value of the position of the mover is generated with the first processing core responsive to the first position feedback signals, and a second value of the position of the mover is generated with the second processing core responsive to the second position feedback signals. The first and second values of the position of the mover are compared with either the first or second processing core to verify operation of the first and second position sensors.

20 Claims, 13 Drawing Sheets

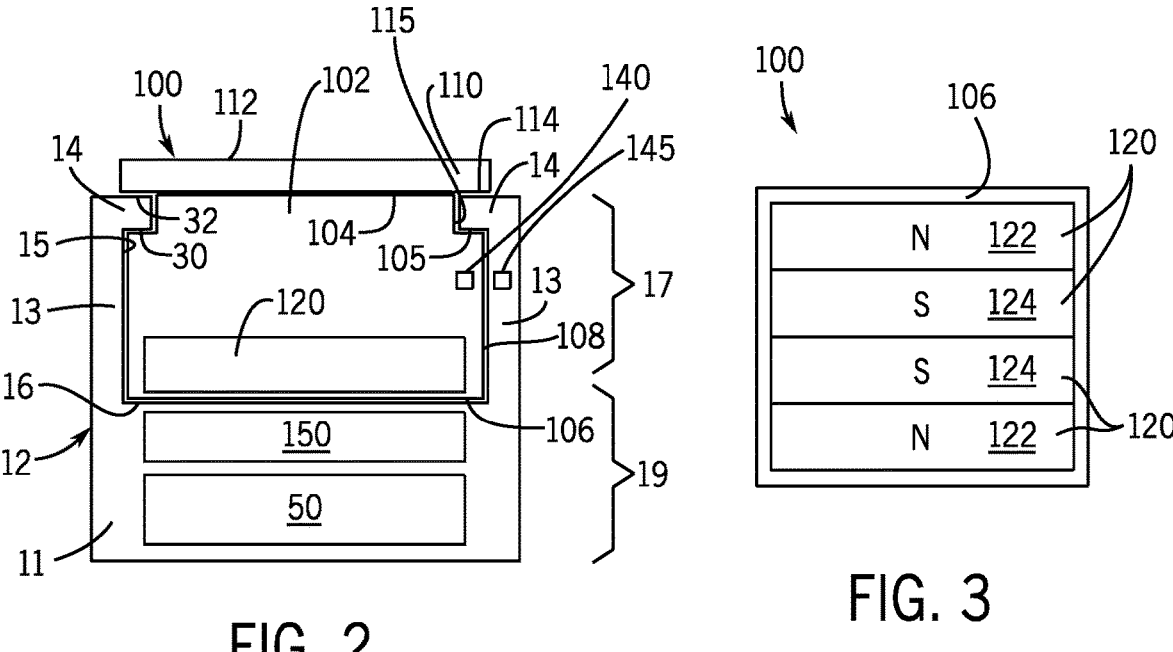
FIG. 2
FIG. 3
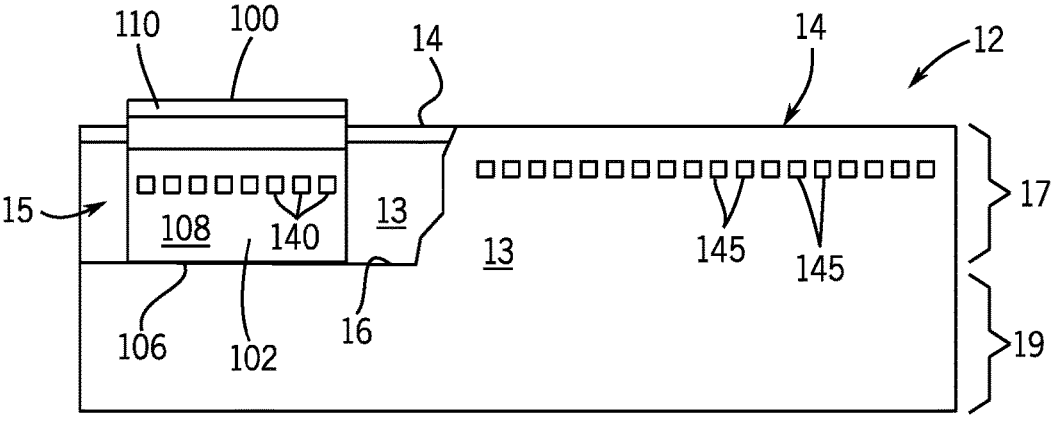
FIG. 4

SYSTEM AND METHOD FOR ACHIEVING POSITION DETECTION INTEGRITY IN AN INDEPENDENT CART SYSTEM

BACKGROUND INFORMATION

The subject matter disclosed herein relates to obtaining position detection integrity in an independent cart system. More specifically, multiple position sensors are monitored to determine the position of each vehicle in an independent cart system with a desired level of safety integrity.

Motion control systems utilizing independent cart technology employ a linear drive system, embedded within a track and multiple vehicles, also referred to as movers or carts, that are propelled along the track via the linear drive system. Movers and linear motors can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled "movers" or carts each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers.

Each of the movers may be independently moved and positioned along the track in response to the electromagnetic fields generated by the coils. In certain applications, the track forms a path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover completes the cycle along a return path and returns to the loading station to receive another unit of the product.

In certain applications, it may be desirable to permit human interaction with a mover or with a product present on the mover. In one example, this interaction may take place at predesignated zones along the track. Rather than having an actuator, robot, or other automated system load and unload a mover, a human may be stationed at a zone along the track to perform loading and unloading of the mover. Optionally, a mover, or combination of movers, may carry a product slowly along one segment of the track in an assembly line. A technician performs a repeated operation or adds a component to the product as the mover travels past a zone on the track. In another example, interaction may be required at any location along the track. In some instances, maintenance of a mover or of the track may be required. A technician may be required to adjust or remove a mover which has become damaged. Optionally, a technician may be needed to remove product which inadvertently fell along the track. Unscheduled maintenance may need to be performed at any location along the track. Such interaction, either at predesignated zones or along the length of the track requires safety control of the movers to prevent injury to a human interacting with the controlled system.

Safety control is used in applications where failure of an industrial controller can create a risk of injury to humans. While safety control is closely related to reliability, safety control places additional emphasis on ensuring correct operation even if it reduces equipment availability. Safety industrial control systems are not optimized for "availability", that is, being able to function for long periods of time without error, but rather for "safety" which is being able to accurately detect error to shut down. Safety industrial controllers normally provide a predetermined safe state for their outputs upon a safety shutdown. The predetermined values of these outputs are intended to put the industrial process into its safest static mode. For that reason, safety controllers may provide run time diagnostic capabilities to detect incorrect operation and to move the control system to predefined "safety states" if a failure is detected. The safety states will depend on the particular process being implemented and cause the actuators to assume a state predetermined to be safest when control correctness cannot be ensured. For example, an actuator controlling cutting machinery might move that machinery to a stop state while an actuator providing air filtration might retain that machinery in an on state.

Safety control capability may be designated, for example, by "safety integrity levels" (SIL) defined under standard IEC 61508 and administered by the International Electrotechnical Commission (IEC) under rule hereby incorporated by reference. Standard IEC EN 61508 defines four SIL levels of SIL-1 to SIL-4 with higher numbers representing higher amounts of risk reduction. Obtaining a desired SIL rating requires a certain degree of diagnostic coverage for components within a system. The degree of diagnostic coverage is defined according to a percentage likelihood that a failure of a component within a system will be detected. Low diagnostic coverage, for example, may require only a sixty percent (60%) chance that a failure will be detected. In contrast, high diagnostic coverage, required for a SIL 3 rating, may require a ninety-nine percent (99%) chance that a failure will be detected. Mitigation of a risk occurring increases the SIL rating and may be achieved by detecting a failure in a system that may cause a dangerous failure before the failure can occur. Therefore, determination of a SIL rating is based, at least in part, on the ability of a system to detect a fault condition and to enter a safe state in response to detecting the fault condition.

In order to permit interaction of a person with the movers or with a product present on the mover, it is necessary to obtain a safety rating, where the safety level required may be a function of the degree of interaction required. As previously discussed, safety ratings or defined based on a degree of diagnostic coverage of components within a system. Among the components present in the independent cart system are position sensors. The position sensors detect the presence of each mover as it travels along the track and generate position feedback signals responsive to detecting this presence. These position feedback signals are used by a controller to determine the present location of a mover along the track.

Thus, it would be desirable to provide diagnostic coverage of the position sensors within an independent cart system.

BRIEF DESCRIPTION

According to one embodiment of the invention, an apparatus for detecting integrity of a position for a mover in an independent cart system includes multiple first position sensors, multiple second position sensors, and a magnet array mounted on the mover. Each of the first position sensors is configured to generate a first position feedback signal corresponding to the position of the mover, and each of the second position sensors is configured to generate a second position feedback signal corresponding to the position of the mover. Each of the first and second position sensors are configured to detect the magnet array to generate the first and second position feedback signals. The apparatus further includes a first processing core and a second processing core. The first processing core is configured to receive the first position feedback signal from each of the first position sensors and to generate a first value of the position of the mover as a function of the first position feedback signals. The second processing core is configured to receive the second position feedback signal from each of the plurality of second position sensors and to generate a second value of the position of the mover as a function of the second position feedback signals. The first processing core is in communication with the second processing core, and at least one of the first and the second processing cores is configured to compare the first value and the second value of the position of the mover to verify operation of the first and second position sensors.

According to another embodiment of the invention, a method for detecting integrity of a position for a mover in an independent cart system includes receiving multiple first position feedback signals at a first processing core and receiving multiple second position feedback signals at a second processing core. Each of the first position feedback signals is generated by a first position sensor, and each of the second position feedback signals is generated by a second position sensor. The first and second position feedback signals are generated responsive to a magnet array mounted on the mover being detected by the first and second position sensors. A first value of the position of the mover is generated with the first processing core responsive to receiving the first position feedback signals, and a second value of the position of the mover is generated with the second processing core responsive to receiving the plurality of second position feedback signals. The first value is compared to the second value of the position of the mover with either the first processing core or the second processing core to verify operation of each of the first position sensors and the second position sensors.

According to still another embodiment of the invention, a method for detecting integrity of a position for a mover in an independent cart system includes receiving multiple first position feedback signals at a first processing core and receiving multiple second position feedback signals at a second processing core. The first position feedback signals include paired sine wave and cosine wave signals, and the second position feedback signals include paired sine wave and cosine wave signals. A first edge of the mover is detected by identifying either the first position feedback signals or the second position feedback signals having an inactive value at a first position along a track for the independent cart system, where either the first position feedback signals or the second position adjacent the first position have an active value. A second edge of the mover is detected by identifying either the first position feedback signals or the second position feedback signals having an inactive value at a second position along a track for the independent cart system, where either the first position feedback signals or the second position adjacent the second position have an active value. A length of the mover magnet array is determined by either the first processing core or the second processing core as a function of the first position and the second position. The length of the mover magnet array, determined by either the first processing core or the second processing core, is compared to a predefined length stored in a memory for either the first processing core or the second processing core to verify operation of the first position feedback signals and the second position feedback signals.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 2 is a sectional view of one embodiment of a mover and track segment included in the linear drive system taken at 2-2 of FIG. 1;

FIG. 3 is a bottom plan view of the exemplary mover of FIG. 2;

FIG. 4 is a partial side cutaway view of the mover and track segment of FIG. 2;

Figure 1:
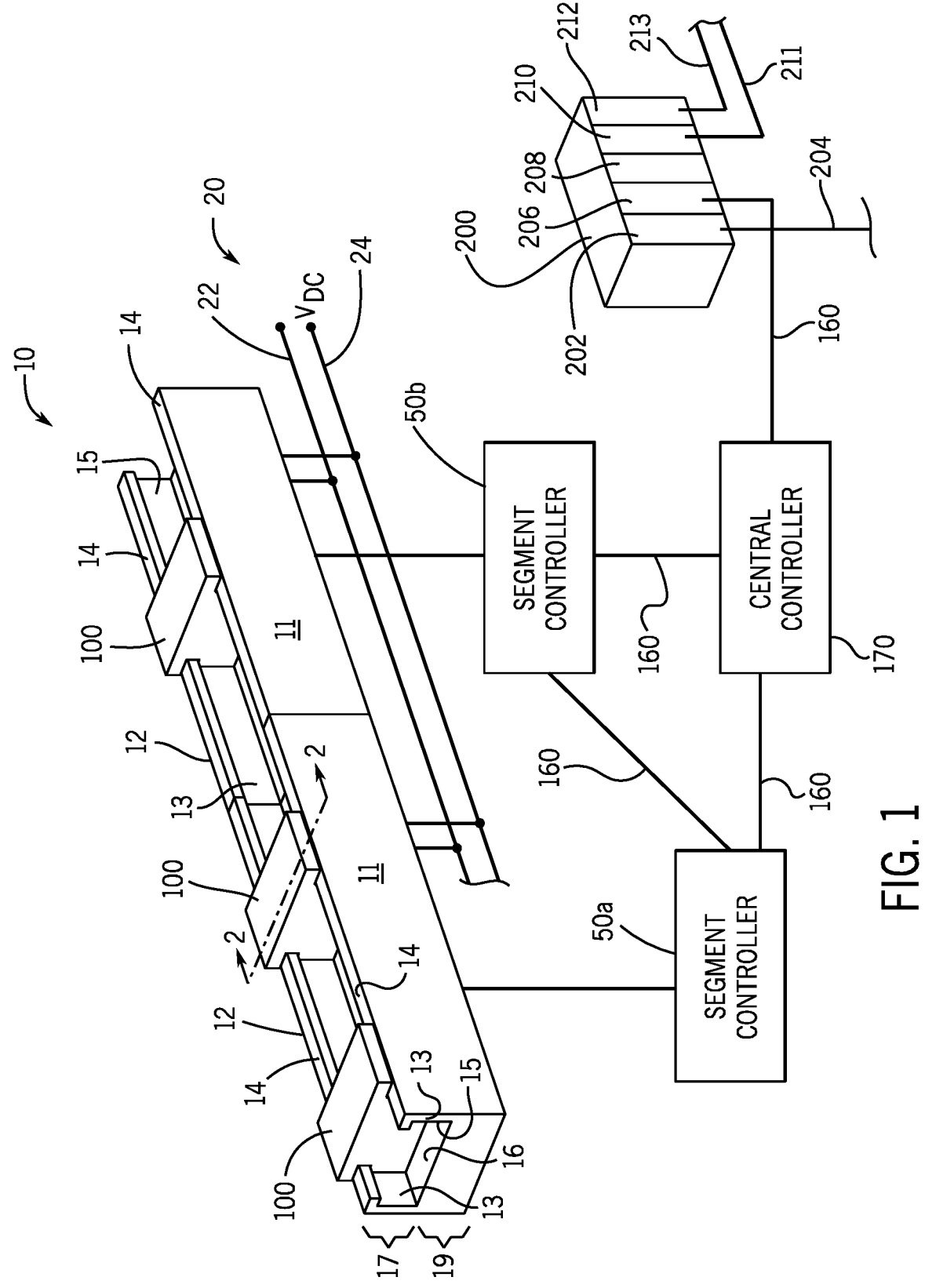
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method for providing diagnostic coverage of position sensors within an independent cart system. The position sensors are divided into at least a first set and a second set of position sensors. In some embodiments of the invention, the position sensors may be divided further into at least three sets of position sensors. Each set of position sensors generates a feedback signal corresponding to a position magnet array, mounted on the mover, traveling past the position sensor. The feedback signals for each set of position sensors are provided to a corresponding processing core. The processing cores each determine a position value and compare the position values to each other. If the position sensors are operating properly, each set of position sensors and the corresponding processing core should determine the same position for a mover.

Turning initially to FIGS. 1-4, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. Track segments 12 may be joined to form a loop supporting a set of movers 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a generally u-shaped channel 15 extending longitudinally along the upper portion 17 of each segment. The channel 15 includes a bottom surface 16 and a pair of side walls 13, where each side wall 13 includes a rail 14 extending along an upper edge of the side wall 13. The bottom surface 16, side walls 13, and rails 14 extend longitudinally along the track segment 12 and define a guideway along which the movers 100 travel. According to one embodiment, the surfaces of the channel 15 (i.e., the bottom surface 16, side walls 13 and rails 14) are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the housing 11 of the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

According to the illustrated embodiment, each mover 100 is configured to slide along the channel 15 as it is propelled by a linear drive system. The mover 100 includes a body 102 configured to fit within the channel 15. The body 102 includes a lower surface 106, configured to engage the bottom surface 16 of the channel, and side surfaces 108 configured to engage the side walls 13 of the channel. The mover 100 further includes a shoulder 105 extending inward from each of the side surfaces 108. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface of each rail 14. The mover 100 further includes a platform 110 secured to the top surface 104 of the body 102. According to the illustrated embodiment, the platform 110 is generally square and the width of the platform 110 is greater than the width between the rails 14. The lower surface of the platform 110, an outer surface of the neck, and an upper surface of the shoulder 105 define a channel 115 in which the rail 14 runs. The channel 115 serves as a guide to direct the mover 100 along the track. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100.

The mover 100 is carried along the track 10 by a linear drive system. The linear drive system is incorporated in part on each mover 100 and in part within each track segment 12. One or more drive magnets 120 are mounted to each mover 100. With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing outward from the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. Various other configurations of the drive magnets 120 may be utilized without deviating from the scope of the invention.

Figure 5:
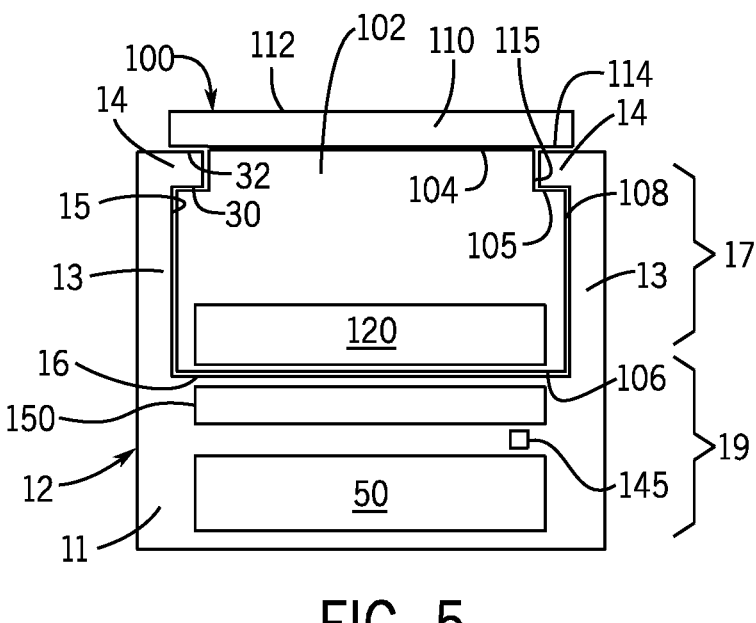
FIG. 5 is a sectional view of another embodiment of a mover and track segment included in the linear drive system taken at 2-2 of FIG. 1.

The linear drive system further includes a series of coils 150 spaced along the length of the track segment 12. With reference also to FIG. 5, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 2, it is contemplated that each segment controller 50 may be mounted in the lower portion 19 of the track segment 12. Each segment controller 50 is in communication with a central controller 170 which is, in turn, in communication with an industrial controller 200. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 200 includes: a power supply 202 with a power cable 204 connected, for example, to a utility power supply; a communication module 206 connected by a network medium 160 to the central controller 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a central controller 170 where the central controller 170 operates to generate commands for each segment controller 50.

Figure 8:
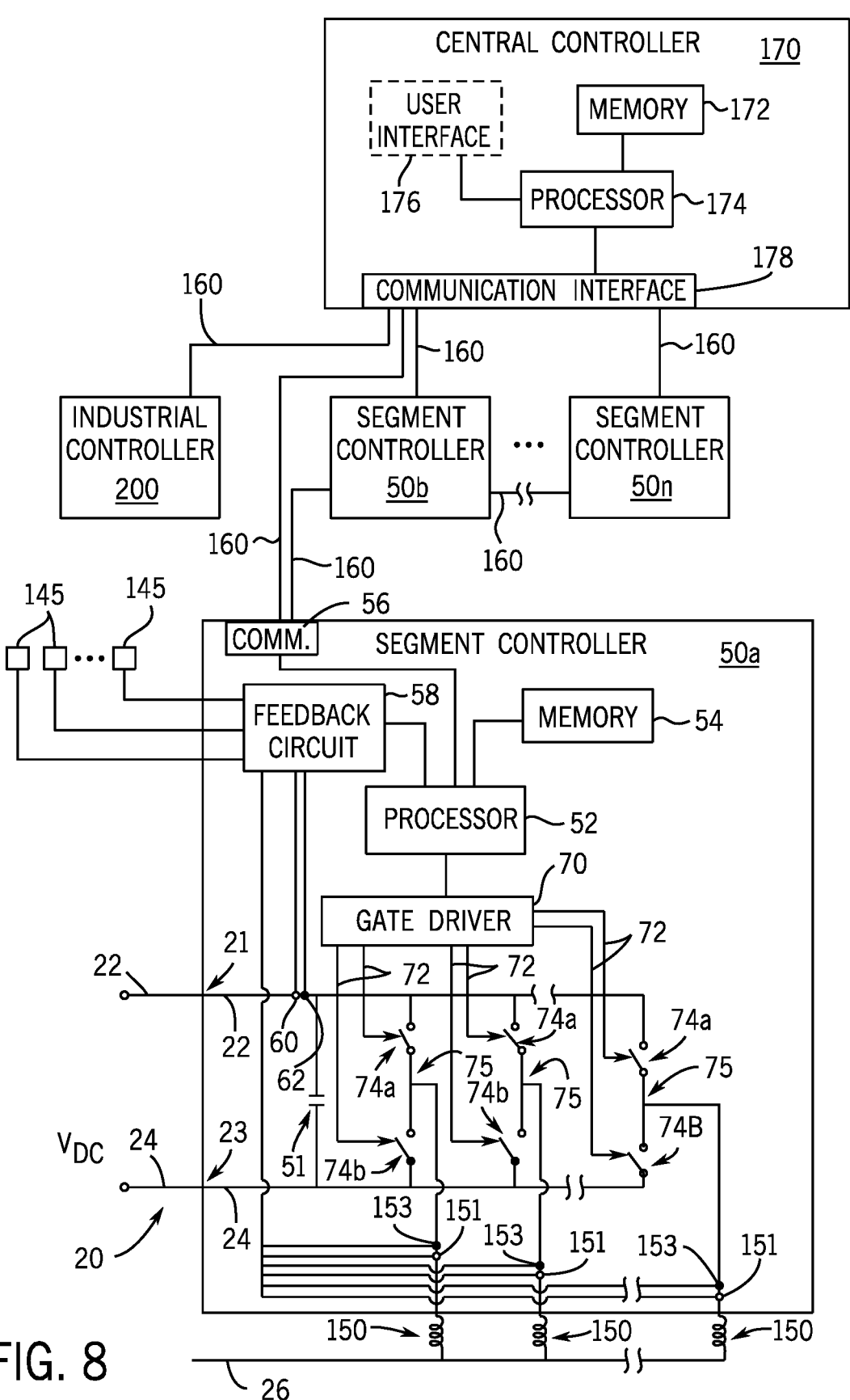
FIG. 8 is a block diagram representation of the exemplary control system of FIG. 1.

With reference also to FIG. 8, the central controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 receives a desired position from the industrial controller 200 and determines one or more motion profiles for the movers 100 to follow along the track 10. A program executing on the processor 174 is in communication with each segment controller 50 on each track segment via a network medium 160. The central controller 170 may transfer a desired motion profile to each segment controller 50. Optionally, the central controller 170 may be configured to transfer the information from the industrial controller 200 identifying one or more desired movers 100 to be positioned at or moved along the track segment 12, and the segment controller 50 may determine the appropriate motion profile for each mover 100.

A position feedback system provides knowledge of the location of each mover 100 along the length of the track segment 12 to the segment controller 50. According to one embodiment of the invention, illustrated in FIGS. 2 and 4, the position feedback system includes one or more position magnets 140 mounted to the mover 100 and an array of 5 spaced along the side wall 13 of the track segment 12. The sensors 145 are positioned such that each of the position magnets 140 are proximate to the sensor as the mover 100 passes each sensor 145. The sensors 145 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted.

Figure 9:
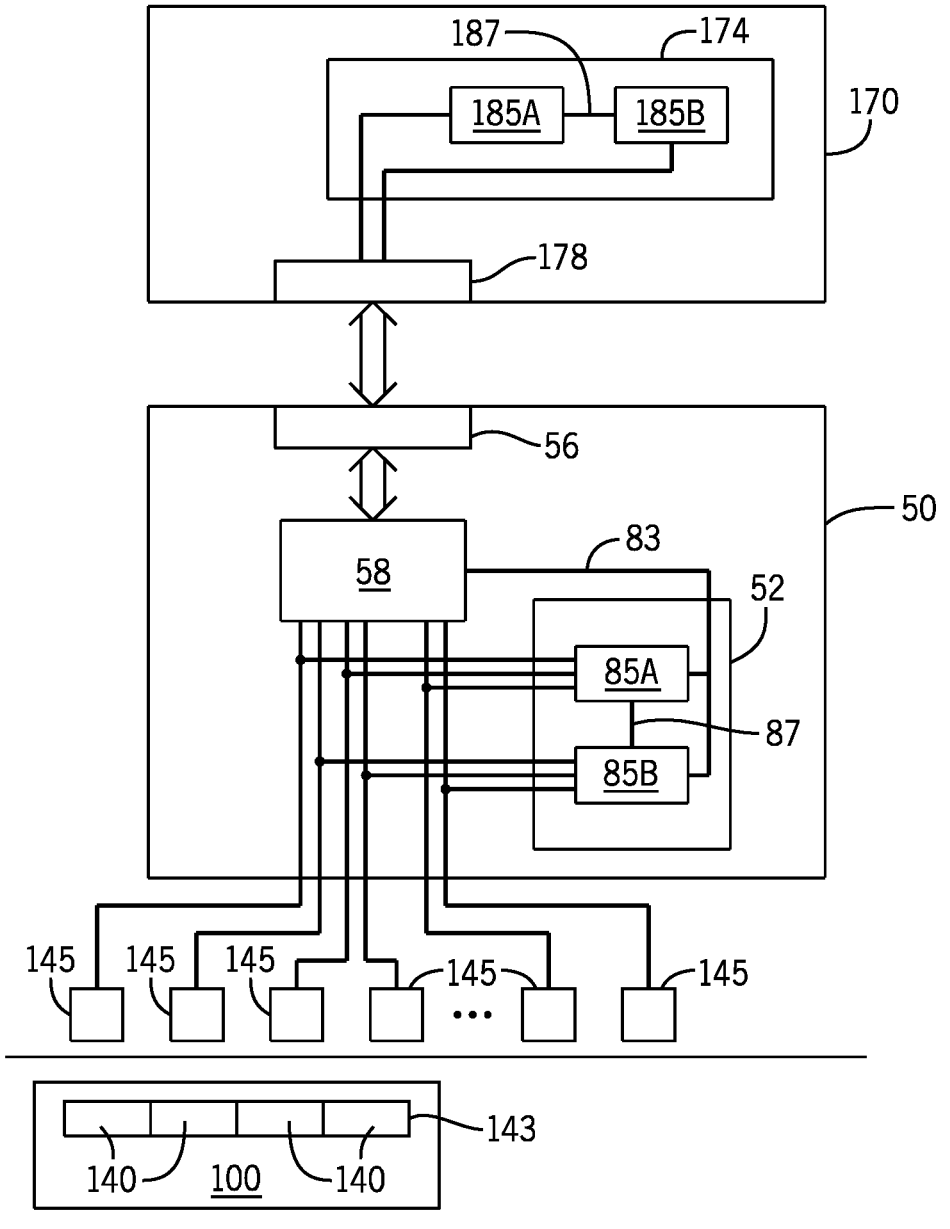
FIG. 9 is a partial block diagram representation of the exemplary control system of FIG. 8 configured as a safety control system.
Figure 10:
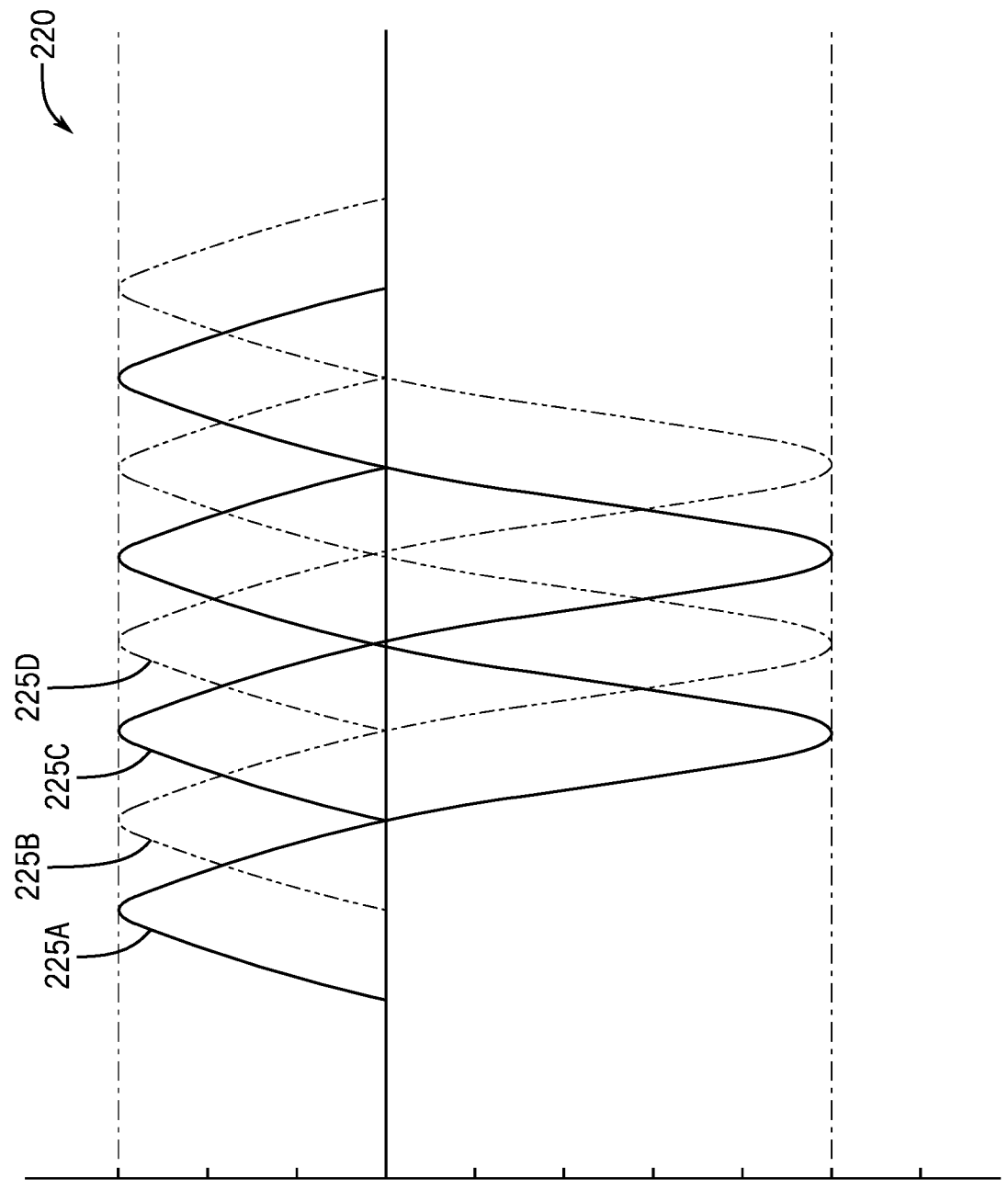
FIG. 10 is a graphical representation of a series of position feedback signals.

According to another aspect of the invention, a position magnet array 143 may be provided as illustrated in FIG. 9. The position magnet array 143 includes multiple position magnets 140 positioned adjacent to each other. The illustrated embodiment shows four position magnets 140 within the position magnet array 143. However, the number of position magnets in the magnet array 143 may vary, and the four illustrated magnets 140 are shown for illustration purposes only and is not intended to be limiting. The position sensors 145 are spaced apart along the length of the track. According to one aspect of the invention, the position sensors 145 are spaced apart such that adjacent position sensors 145 generate a feedback signal 225 which is offset from each other by ninety electrical degrees (90°). With reference to FIG. 10, four position sensors 145, each adjacent to one another, are generating feedback signals 225 as a position magnet array 143 passes the sensors. A first position sensor generates the first position feedback signal 225A. A second position sensor generates the second position feedback signal 225B. A third position sensor generates the third position feedback signal 225C. A fourth position sensor generates the fourth position feedback signal 225D.

According to one aspect of the invention, the four position sensors 145 may be spaced apart by one-quarter (¼) cycle of the analog feedback signal. The waveform 225 includes a positive half-cycle and a negative half-cycle. The positive half-cycle begins at an amplitude of zero, increases to a maximum value, and returns to an amplitude of zero. Similarly, the negative half-cycle begins at an amplitude of zero, decreases to a maximum negative value, and returns to an amplitude of zero. The positive and negative half-cycles alternate as the magnet array 143 passes by the position sensors 14. As shown in FIG. 10, each waveform 225 is offset from the adjacent waveform by ninety degrees. By spacing the four position sensors 145 apart a distance equal to one-quarter cycle of the waveform, each adjacent waveform is shifted in phase by ninety degrees. Although the illustrated analog feedback signals 225 are not uniformly sinusoidal, each position sensor 145 generates a feedback signal 225 having a consistent waveform. A first waveform will be referred to herein as a sine wave signal and an adjacent waveform will be referred to herein as a cosine wave signal. The terms "sine wave signal" and "cosine wave signal" are intended to identify two waveforms having the same wave shape but also being shifted in phase by ninety degrees just as a cosine is shifted in phase ninety degrees from a sine. The terms sine wave signal and cosine wave signal do not require feedback signals having a uniform sinusoidal waveshape but rather identify periodic waveforms having waveforms identical to each other and shifted in phase by one-quarter of the periodic waveform. According to other embodiments of the invention, the position sensors 145 may be configured to generate feedback signals 225 which have uniform sinusoidal waveforms.

In some embodiments of the invention, a single position sensor 145 may be configured to generate two of the position feedback signals 225. A single position sensor 145 may generate a sine wave signal and a cosine wave signal. Thus, a first position sensor generates the first position feedback signal 225A and the second position feedback signal 225B. A second position sensor generates the third position feedback signal 225C and the fourth position feedback signal 225D. The position sensors 145 may still be spaced apart by one-quarter of a cycle, where the sine wave signal of one position sensor 145 overlaps the cosine wave signal of an adjacent position sensor. Alternately, the position sensors 145 may be spaced apart by one-half cycle with each position sensor 145 independently generating two of the illustrated waveforms. The feedback signal is provided to a feedback circuit 58 which, in turn, provides a signal to the processor 52 corresponding to the magnet 140 passing the sensor 145.

Figure 6:
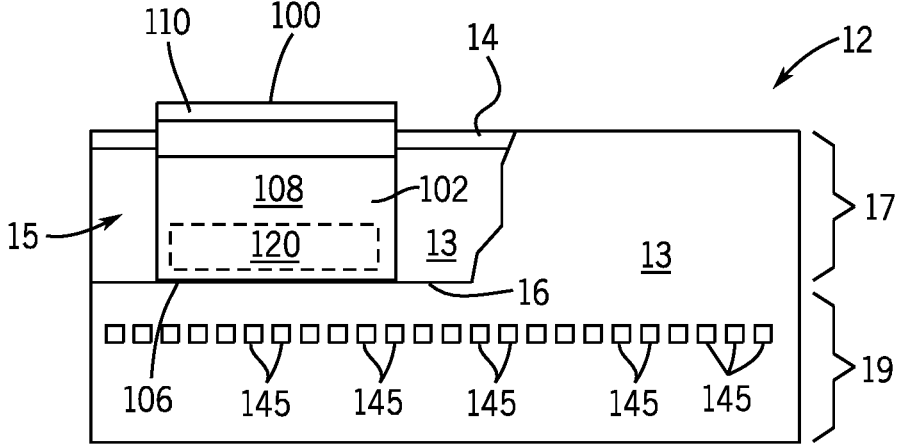
FIG. 6 is a partial side cutaway view of the mover and track segment of FIG. 5.
Figure 7:
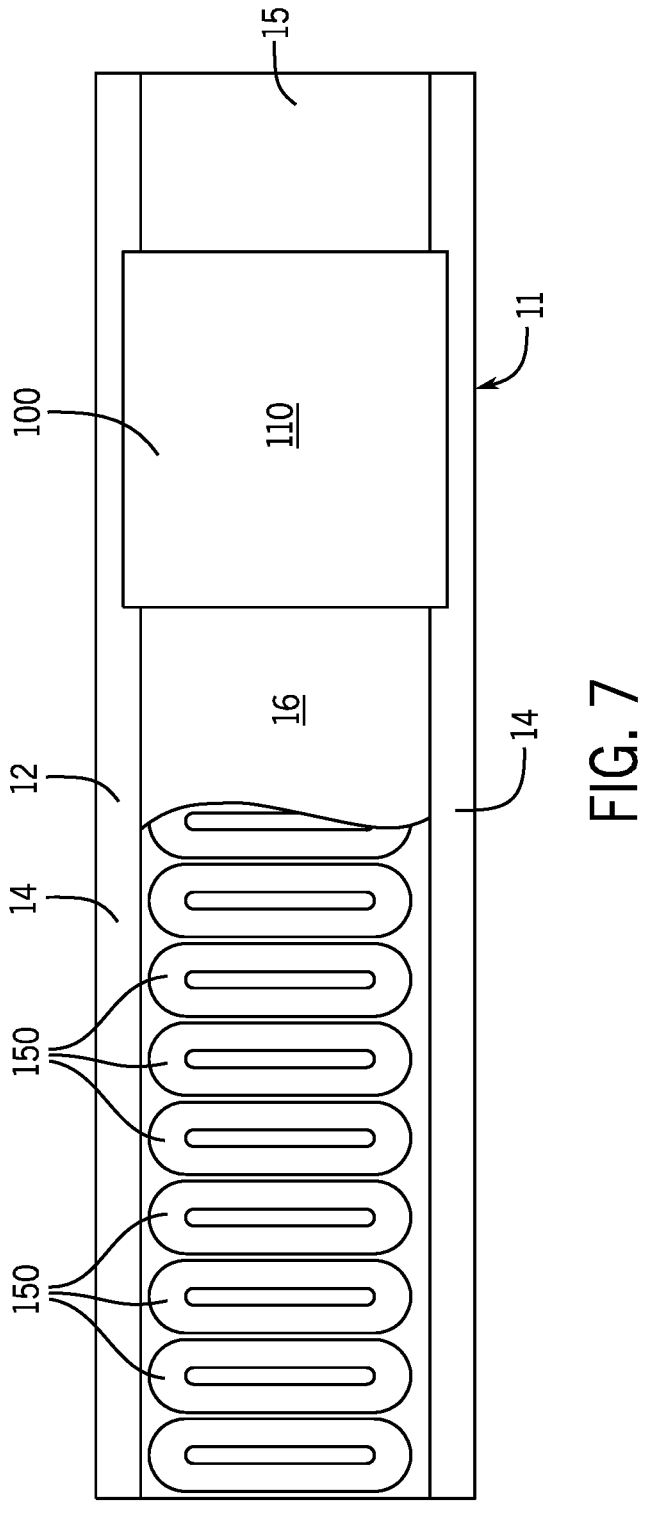
FIG. 7 is a partial top cutaway view of the mover and track segment of FIG. 2.

According to another embodiment of the invention, illustrated in FIGS. 5 and 6, the position feedback system utilizes the drive magnets 120 as position magnets. Position sensors 145 are positioned along the track segment 12 at a location suitable to detect the magnetic field generated by the drive magnets 120. According to the illustrated embodiment, the position sensors 145 are located below the coils 150. Optionally, the position sensors 145 may be interspersed with the coils 150 and located, for example, in the center of a coil or between adjacent coils. According to still another embodiment, the position sensors 145 may be positioned within the upper portion 17 of the track segment 12 and near the bottom surface 16 of the channel 15 to be aligned with the drive magnets 120 as each mover 100 travels along the tracks segment 12. For convenience, operation of the position feedback system will be discussed herein with respect to the position magnets 140 illustrated in FIGS. 2 and 4. However, it is understood that the position feedback system may similarly utilize the drive magnets 120 to detect a position of the mover 100.

The segment controller 50 also includes a communication interface 56 that receives communications from the central controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately provide positive or negative voltages to one the coils 150.

The power section in each segment controller 50 may include multiple legs, where each leg is connected in parallel between the positive rail 22 and the negative rail 24. According to the illustrated embodiment, three legs are shown. However, the number of legs may vary and will correspond to the number of coils 150 extending along the track segment 12. Each leg includes a first switching device 74a and a second switching device 74b connected in series between the positive rail 22 and the negative rail 24 with a common connection 75 between the first and second switching devices 74a, 74b. The first switching device 74a in each leg 221 may also be referred to herein as an upper switch, and the second switching device 74b in each leg 221 may also be referred to herein as a lower switch. The terms upper and lower are relational only with respect to the schematic representation and are not intended to denote any particular physical relationship between the first and second switching devices 74a, 74b. The switching devices 74 include, for example, power semiconductor devices such as transistors, thyristors, and silicon-controlled rectifiers, which receive the switching signals 72 to turn on and/or off. Each of switching devices may further include a diode connected in a reverse parallel manner between the common connection 75 and either the positive or negative rail 22, 24.

The processor 52 also receives feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. The energized coils 150 create an electromagnetic field that interacts with the drive magnets 120 on each mover 100 to control motion of the movers 100 along the track segment 12.

Turning again to FIG. 9, additional details of a segment controller 50 and a central controller 170 configured for a safety application are illustrated. The processor 174 of the central controller 170 includes a first core 185A and a second core 185B. According to one aspect of the invention, the first core 185A may execute a first control program as a primary control program and the second core 185B may execute a second control program as a redundant control program. The primary and redundant control programs may be identical control programs or partially identical control programs, where only a portion of the control functions are required to be duplicated to achieve a desired safety level. The output of the primary and redundant control programs are compared to each other to verify correct operation of each control program. A safety-rated communication channel 187 is provided between the first core 185A and the second core 185B to provide high-speed communications between the two processing cores where the communication occurs with the desired safety rating. According to another aspect of the invention, the first core 185A may execute certain non-safety control tasks and the second core 185B may execute safety tasks. The safety tasks may include monitoring inputs and outputs, storing data values to redundant memory, and the like.

Similarly, the processor 52 of the segment controller 50 includes a first core 85A and a second core 85B. According to one aspect of the invention, the first core 85A may execute a first set of instructions as a primary program and the second core 185B may execute a second set of instructions as a redundant program. The primary and redundant programs may be identical programs or partially identical programs, where only a portion of the instructions are required to be duplicated to achieve a desired safety level. The output of the primary and redundant programs are compared to each other to verify correct operation of each program. A safety-rated communication channel 87 is provided between the first core 85A and the second core 85B to provide high-speed communications between the two processing cores where the communication occurs with the desired safety rating. According to another aspect of the invention, the first core 85A may execute certain non-safety tasks and the second core 85B may execute safety tasks. The safety tasks may include monitoring inputs and outputs, storing data values to redundant memory, and the like.

Each of the position sensors 145 generates a feedback signal 225, as discussed above, where the feedback signal is provided to a feedback circuit 58. Each of the safety cores 85 in the processor 52 are further configured to monitor at least a portion of the feedback signals 225 from the position sensors 145. According to the illustrated embodiment, the first core 85A monitors the feedback signals 225 from half of the position sensors 145, and the second core 85B monitors the feedback signals from the other half of the position sensors 145. Each core 85A, 85B is configured to receive the feedback signal of the position sensors 145 on an alternating basis. The illustrated embodiment shows a monitoring connection where the feedback signals 225 may be sent to both the feedback circuit 58 and to each of the cores 85A. A communication channel 83 is also provided between the feedback circuit 58 and each of the cores 85A, 85B. It is contemplated that this communication channel 83 may be a safety-rated communication channel or, alternately, the communication channel 83 may be a "black channel" in the safety-rated communications between the feedback circuit 58 and the cores 85A, 85B. A "black channel" communication channel includes components which, by themselves, do not provide safety-rated communications. However, end-points, such as the feedback circuit 58 and each core 85A, 85B, which communicate over the black channel include methods to make communications between the two end points meet a desired safety rating. The feedback circuit 58 may receive each of the feedback signals 225 from the position sensors 145 and transmit values of the feedbacks signals 225 to the cores 85A, 85B via the communication channel 83. According to still other embodiments of the invention, the feedback circuit 58 may include dedicated processing cores to perform at least a portion of the safety-related tasks for the safety cores 85A, 85B relating to position feedback. The illustrated embodiment is intended to be exemplary and not limiting.

In operation, the central controller 170 coordinates motion of the movers 100 along each track segment 12. The central controller 170 receives a command from an external controller, such as the industrial controller 200 shown in FIG. 1, corresponding to a desired location or to a desired trajectory for each mover 100. The central controller 170 may relay the desired location or desired trajectory directly to the appropriate segment controller 50 with the corresponding mover 100 present along the track segment 12. Optionally, the central controller 170 may perform some initial processing on the command and generate, for example, a motion profile, a speed command, a position command, or the like for a mover 100 and transmit the processed command to the corresponding segment controller 50.

Figure 11:
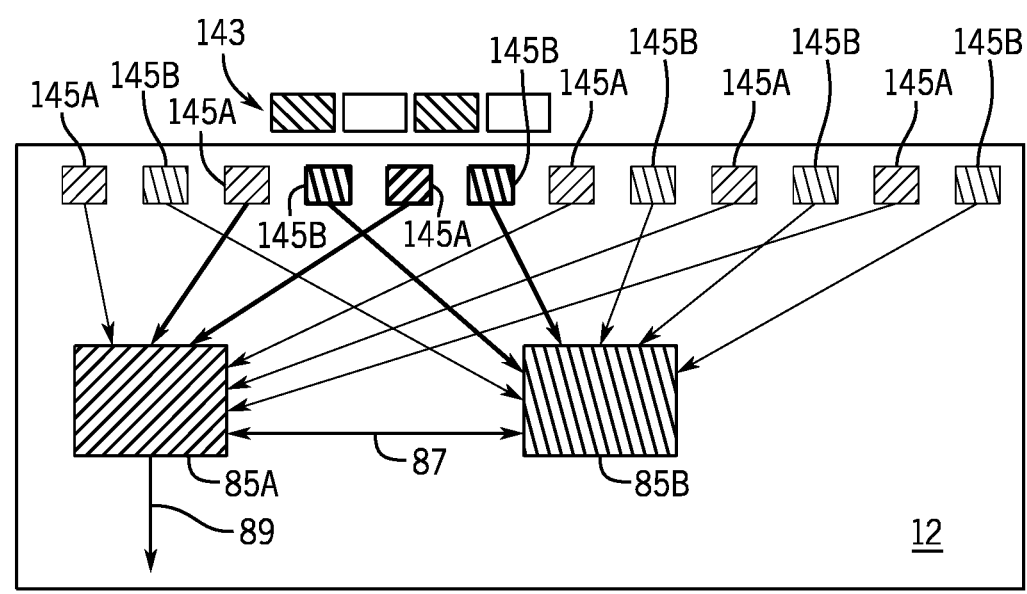
FIG. 11 is a block diagram representation of one embodiment of a distribution of position sensors and safety cores for the safety control system of FIG. 9.
Figure 13:
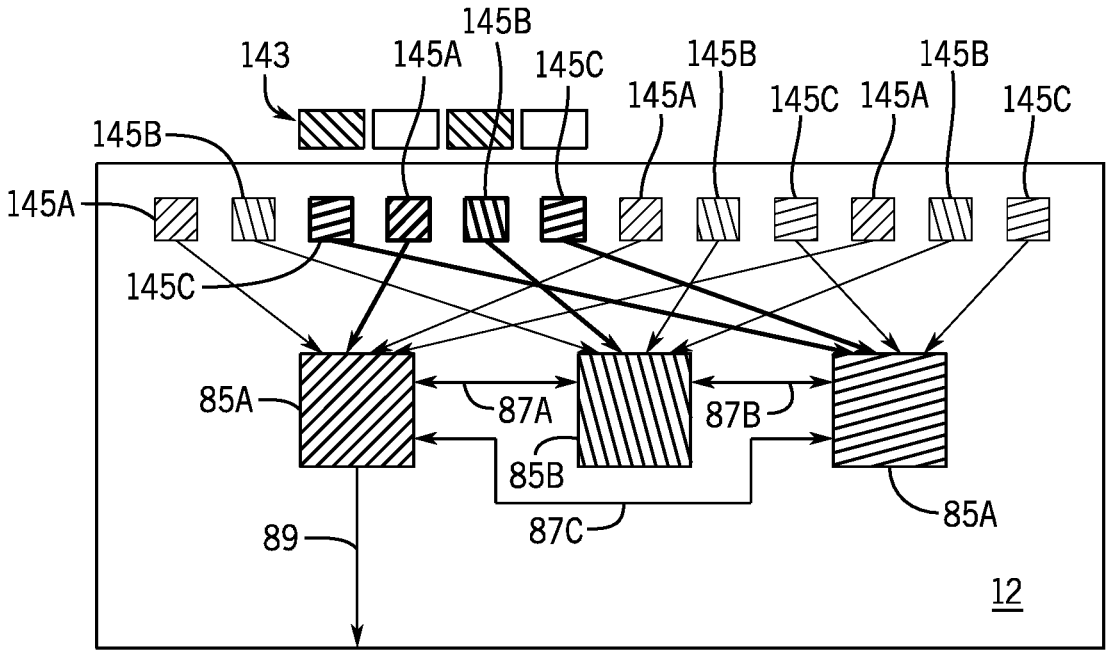
FIG. 13 is a block diagram representation of the distribution of position sensors and safety cores for the safety control system of FIG. 11 configured with triple redundancy.

Turning next to FIG. 11, a first arrangement of position sensors 145 and processing cores 85 is illustrated. Half of the position sensors 145 are defined as first position sensors 145A, and the other half of the position sensors 145 are defined as second position sensors 145B. The first position sensors 145A and the second position sensors 145B are arranged in an alternating manner across the length of a track segment 12. Each of the first position sensors 145A are connected to the first processing core 85A to provide the position feedback signal generated by each first position sensor 145A to the first processing core 85A. Each of the second position sensors 145B are connected to the second processing core 85B to provide the position feedback signal generated by each second position sensor 145B to the second processing core 85B. In a similar configuration illustrated in FIG. 13, the position sensors 145 are divided into thirds and three processing cores 85A, 85B, 85C are provided in each track segment 12. The first position sensors 145A, the second position sensors 145B, and the third position sensors 145C are arranged consecutively in a repeating manner across the length of a track segment 12. Each of the first and second position sensors 145A, 145B are again connected to the first and second processing core 85A, 85B, respectively. Each of the third position sensors 145C are connected to the third processing core 85C to provide the position feedback signal generated by each third position sensor 145C to the third processing core 85C.

Figure 12:
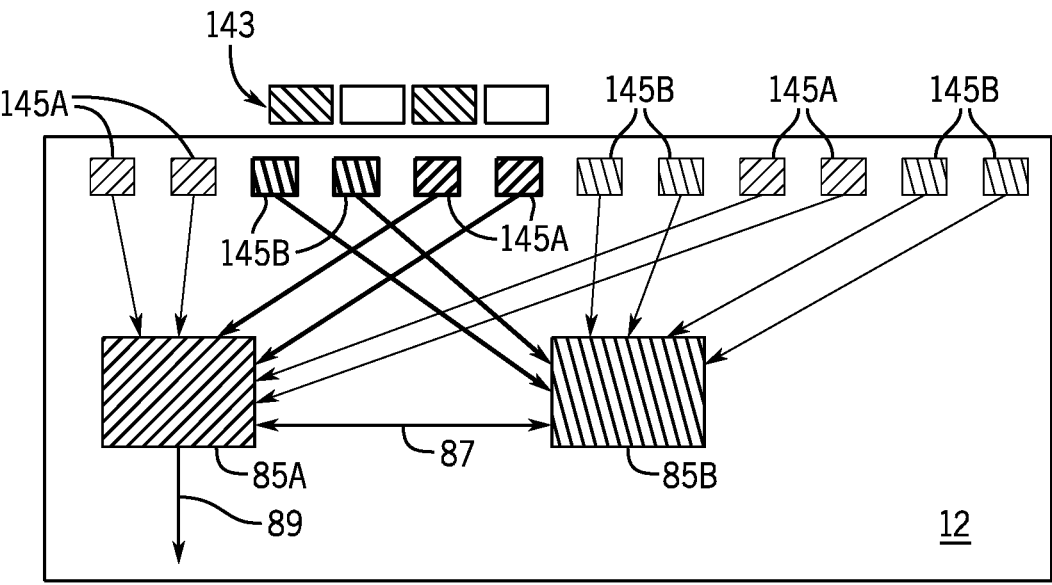
FIG. 12 is a block diagram representation of another embodiment of a distribution of position sensors and safety cores for the safety control system of FIG. 9.
Figure 14:
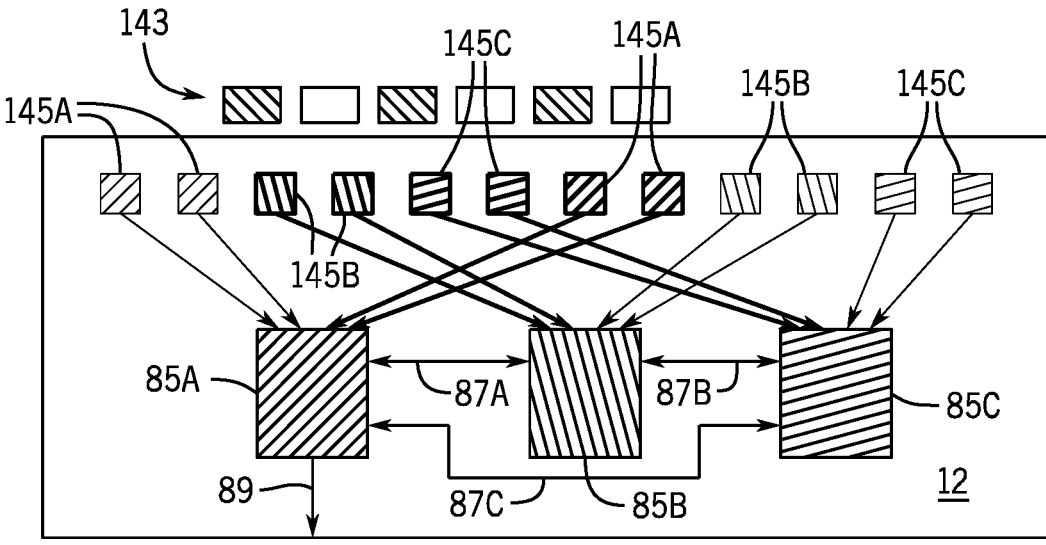
FIG. 14 is a block diagram representation of the distribution of position sensors and safety cores for the safety control system of FIG. 12 configured with triple redundancy.

Turning next to FIG. 12, a second arrangement of position sensors 145 and processing cores 85 is illustrated. Half of the position sensors 145 are defined as first position sensors 145A, and the other half of the position sensors 145 are defined as second position sensors 145B. In this embodiment, however, position sensors are assigned to the first position sensor 145A and the second position sensors 145B in pairs. Rather than each position sensor alternately belonging to either the first or second set of position sensors, each pair of position sensors is assigned to either the first or second set of position sensors. Thus, pairs of the first position sensors 145A and pairs of the second position sensors 145B are arranged in an alternating manner across the length of the track segment 12. Each of the first position sensors 145A are connected to the first processing core 85A to provide the position feedback signal generated by each first position sensor 145A to the first processing core 85A. Each of the second position sensors 145B are connected to the second processing core 85B to provide the position feedback signal generated by each second position sensor 145B to the second processing core 85B. In a similar configuration illustrated in FIG. 14, the position sensors 145 are divided into thirds and three processing cores 85A, 85B, 85C are provided in each track segment 12. The pairs of first position sensors 145A, the pairs of second position sensors 145B, and the pairs of third position sensors 145C are arranged consecutively in a repeating manner across the length of a track segment 12. Each of the first and second position sensors 145A, 145B are again connected to the first and second processing core 85A, 85B, respectively. Each of the third position sensors 145C are connected to the third processing core 85C to provide the position feedback signal generated by each third position sensor 145C to the third processing core 85C.

When position sensors 145 are arranged in a redundant manner, with the position sensors 145 divided into two sets and providing feedback signals to two processing cores 85, each processing core may independently determine a value for the position of a mover 100 along the track. The two processing cores 85 compare the values independently determined to verify that the same position value was determined. If the position sensors 145 are operating properly, each processing core 85 is receiving the feedback signals properly, and each processing core is executing its respective set of instructions properly, the same position value should be determined. A difference in the determined position values is able to identify an error in the position feedback system and the segment controller 50 or central controller 170 may take appropriate action to enter a safe operating state.

When the position sensors 145 are arranged in a triple redundant manner, with the position sensors divided into three sets and providing feedback signals to three processing cores 85, the desired safety level may be achieved while also maintaining a higher level of availability. Each processing core 85 again independently determines a value for the position of the mover 100 along the track. Similar to the double redundant system described above, correct operation of the system should yield the same position value from each of the three processing cores 85. If, however, a failure has occurred in one set of position sensors or in one of the processing cores 85, the control system may continue operation. Rather than relying on all three values matching, the system may be configured to operate under a voting process. The processing cores 85 may compare all three values of the position value that were determined and, if only two of the values are matching, the processing cores 85 use the matching values as the correct value of the position of the mover 100. A single failure will cause one value of the position to differ from the other two values. In this manner, a warning message may be posted to a technician that one of the position values is differing from the other two position values, but operation may continue. Thus, the technician may determine an appropriate time to perform maintenance on the system rather than immediately transitioning to the safe operating state required above for the double redundant system.

In FIG. 11, it is contemplated that each position sensor 145 is configured to generate both a sine wave position feedback signal and a cosine wave position feedback signal as discussed above with respect to FIG. 10. The first position sensors 145A provide both the sine and cosine wave signals to the first processing core 85A, and the second position sensors 145B provide both the sine and cosine wave signals to the second processing core 85B. In FIG. 12, it is contemplated that each position sensor 145 generates a single position feedback signal. Thus, a first position feedback signal generated by the first position sensor of a pair of position sensors corresponds to a sine wave signal, and a second position feedback signal generated by the second position sensor of a pair of position sensors corresponds to a cosine wave signal. Each position sensor in the pair of first position sensors 145A provides their corresponding position feedback signal to the first processing core 85A, and each position sensor in the pair of second position sensors 145B provides their corresponding position feedback signal to the second processing core 85B.

Each of the first processing core 85A and the second processing core 85B is configured to determine a position for the mover 100 as a function of the position feedback signals 225 received by the processing core 85. Using the magnitude of the sine and cosine position feedback signals received, each processing core 85 can determine a position of the magnet array 143 with respect to the position sensors 145. Having knowledge of which position sensor 145 provided the position feedback signal 225 and the position of the magnet array 143 with respect to the position sensors 145, each processing core 85 may determine a position along the track for the mover 100. The position assigned to the mover 100 may correspond to a first end of the mover, a second end of the mover, a center of the mover, or any other position along the mover. Lengths of each mover 100 are stored in memory 54 of the segment controller 50 such that the overall range of positions for the mover 100 along the track may be determined as a function of a single position assigned to any location along the length of the mover 100.

Having independently determined positions for a mover 100, each processing core 85 may then validate the determined position by comparing it to the position determined by the other processing core. The first processing core 85A determines a first value of the position and transmits the first value of position to the second processing core 85B via the dedicated communication channel 87 present between the two processing cores. The second processing core 85B determines a second value of the position and transmits the second value of position to the first processing core 85A via the dedicated communication channel 87 present between the two processing cores. Each processing core 85 compares the first value to the second value. When the first and second values of position agree within a predefined tolerance, the processing cores 85A, 85B determine that each of the position sensors 145 generating one of the position feedback signals 225 from which either the first or second value of position was determined is operating properly. When the first and second values of position differ beyond the predefined tolerance, the processing cores 85A, 85B determine that at least one of the position sensors 145 generating one of the position feedback signals 225 from which either the first or second value of position was determined has failed.

As further illustrated in FIGS. 11-14, the first processing core 85A is configured to transmit a safety-rated position value via a communication channel 89 to the central controller 170. When the two processing cores 85A, 85B agree that the position has been properly determined, a safety-rated position value may be transmitted via the communication channel 89. When either processing core 85A, 85B detects an error in one of the position feedback signals 225 or the position sensor 145 generating the position feedback signal, an error message may be transmitted via the communication channel 89.

Figure 15:
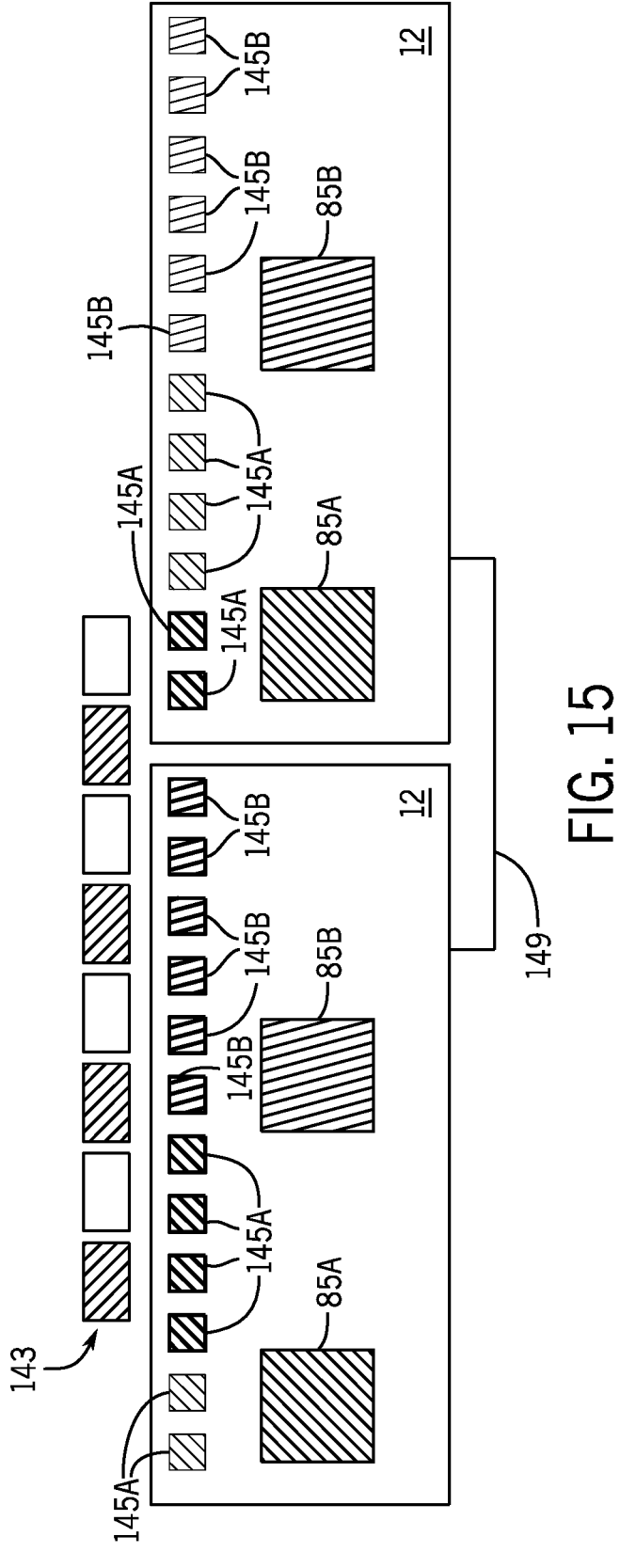
FIG. 15 is a block diagram representation of still another embodiment of a distribution of position sensors and safety cores for the safety control system of FIG. 9.

Turning next to FIG. 15, still other distributions of first position sensors 145A and second position sensors 145B may be implemented. The lengths of movers 100 may vary according to application requirements. In some applications, movers 100 may be required to transport smaller payloads and, therefore, may have a length in a range of tens of millimeters (e.g., 50-100 mm). In other applications, movers 100 may be required to transport larger payloads and, therefore, may have a length in a range of meters (e.g., 1-9 m). The magnet array 143 mounted to mover 100 may span a majority of the length of the mover and, therefore, may similarly have a range from tens of millimeters to meters in length. As the length of the magnet array 143 increases, it may exceed one-half of the length of a track segment 12. In such applications, the position sensors 145 present on a track may still be divided evenly between first and second sets of position sensors while positioning each of the first position sensors 145A along the first half of the track segment and positioning each of the second position sensors 145B along the second half of the track segment. As long as at least a portion of the first position sensors 145A and a portion of the second position sensors 145B detect the magnet array 143, the processing cores 85A, 85B are able to determine the position of the mover with integrity to obtain a desired safety rating.

As movers 100 travel along the track 10 of the independent cart system, the mover 100 transitions from one track segment 12 to another. With reference again to FIG. 15, the illustrated magnet array 143 is shown transitioning between adjacent track segments 12. As illustrated, the magnet array 143 extends a sufficient distance such that a portion of the first position sensors 145A and each of the second position sensors 145B on the first track segment are able to detect the magnetic fields generated by the magnet array 143. However, only a pair of first position sensors 145A on the second track segment are able to detect the magnetic fields generated by the magnet array 143. Thus, the second core 85B in the second track segment would not have any position feedback signal by which it could determine a position of the mover. Although more clearly illustrated in the embodiment of FIG. 15 when the first position sensors 145A are distributed over a first half of the track segment 12 and the second position sensors 145B are distributed over a second half of the track segment 12, the issue is equally applicable, if only for a short duration, for any of the distributions of position sensors discussed herein, such as FIGS. 11 and 12.

To permit both track segments 12 to determine a safety rated position value as a mover 100 transitions between track segments, a safety rated communication channel 149 is established between adjacent track segments 12. The safety rated communication channel 149 may be a dedicated communication channel, including, for example, redundant transmission paths between adjacent track segments. The communication interface 56 or the processors 52 on each segment controller 50 may be configured to verify proper transmission of data across the redundant transmission paths. Alternately, the network medium 160 may be utilized to establish the safety rated communication channel 149. The entire communication channel 149 may include white devices, meaning each device is configured to achieve the desired safety level. Alternately, a portion of the safety rated communication channel 149 may be implemented, in part, via a black channel, where the devices in the black channel are not responsible for achieving the desired safety level, but an end point on either side of the black channel will be configured to achieve the desired safety level.

With a safety rated communication channel 149 established between adjacent track segments 12, each processing core 85A, 85B on one segment controller 50 may communicate with the corresponding processing core 85A, 85B for the segment controller 50 in the adjacent track segment. The processing cores 85A, 85B may transmit the position value determined by one processing core to the processing core on an adjacent track segment 12. When a processing core 85A, 85B on a track segment 12 receives the position feedback signals 225 from the position sensors 145, the processing core uses the feedback signals to determine a position value. When only one of the processing cores 85A, 85B is receiving a position feedback signal 225 during a mover transition between adjacent track segments 12, the other processing core may utilize the position value from an adjacent track segment for verification of the position value determined by the first processing core. As the mover transitions further, both processing cores will begin receiving position feedback signals 225 and each processing core 85 determines a value for the position of the mover as discussed above. Optionally, the processing cores 85A, 85B may transmit values of the feedback signals 225 between adjacent track segments 12 rather than transmitting position values.

Figure 16:
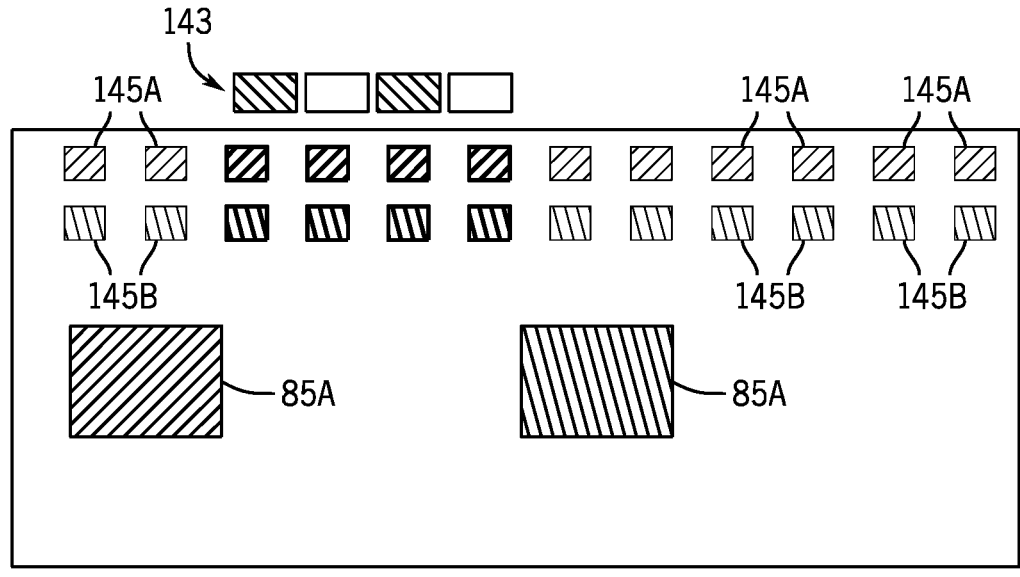
FIG. 16 is a block diagram representation of a distribution of position sensors with full redundancy for the safety control system of FIG. 9.

Turning next to FIG. 16, still another distribution of position sensors 145 is illustrated. As shown in FIG. 16, the position sensors 145 may be fully redundant, where a first position sensor 145A and a second position sensor 145B are located at each quarter cycle of the magnet array 143 along a length of the track segment. In this configuration, each of the first processing core 85A and the second processing core 85B will always receive a position feedback signal 225 when the mover 100 is either partially or fully positioned over a track segment 12.

Figure 17:
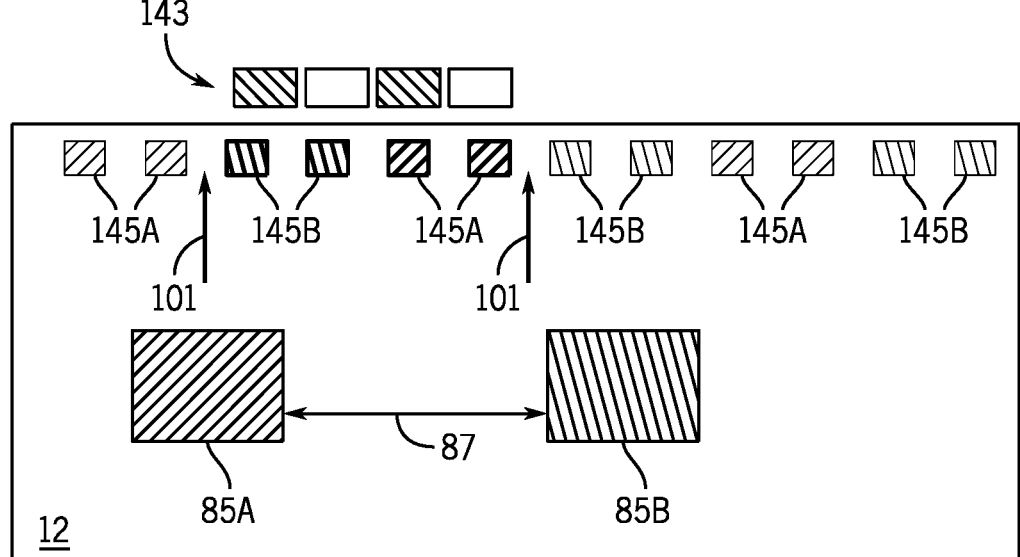
FIG. 17 is a block diagram representation of edge detection performed by the safety control system of FIG. 9.

According to another aspect of the invention, one or both of the processing cores 85 may be configured to detect one or both edges 101 of a mover 100. With reference to FIG. 17, the track segment 12 includes pairs of position sensors 145 alternately spaced along the length of the track with a first pair of position sensors 145 designated first position sensors 145A, a second pair of position sensors designated second position sensors 145B, and the pairs of first and second position sensors alternately repeating along the track segment. The magnet array 143 spans at least two pairs of position sensors, such that both the first position sensors 145A and the second position sensors 145B are generating position feedback signals 225 for the respective processing cores 85A, 85B. Each processing core, however, is unable, by itself, to utilize the position feedback signals from just the first or second position sensors 145A, 145B to identify an edge of the mover. With reference to the illustrated example, the active second position sensors 145B correspond to two of the position sensors over which the mover 100 is located. However, the second processing core 85B would not know whether the pair of first position sensors 145A either directly in front or directly behind the pair of second position sensors 145B is active. Similarly, the active first position sensors 145A correspond to two of the position sensors over which the mover 100 is located. However, the first processing core 85A would not know whether the pair of second position sensors 145B either directly in front or directly behind the pair of first position sensors 145A is active. The two processing cores 85B are in communication with each other via the safety rated communication channel 87. Thus, the first processing core 85A is able to indicate to the second processing core 85B which of the first position sensors 145A is active, and the second processing core 85B is able to indicate to the first processing core 85A which of the second position sensors 145B is active. Both the first and second processing cores 85A, 85B then know which of the position sensors is active and which is inactive. An edge 101 of the mover 100 may be identified by determining which position sensor 145 is active and adjacent to another position sensor 145 which is inactive.

Figure 18:
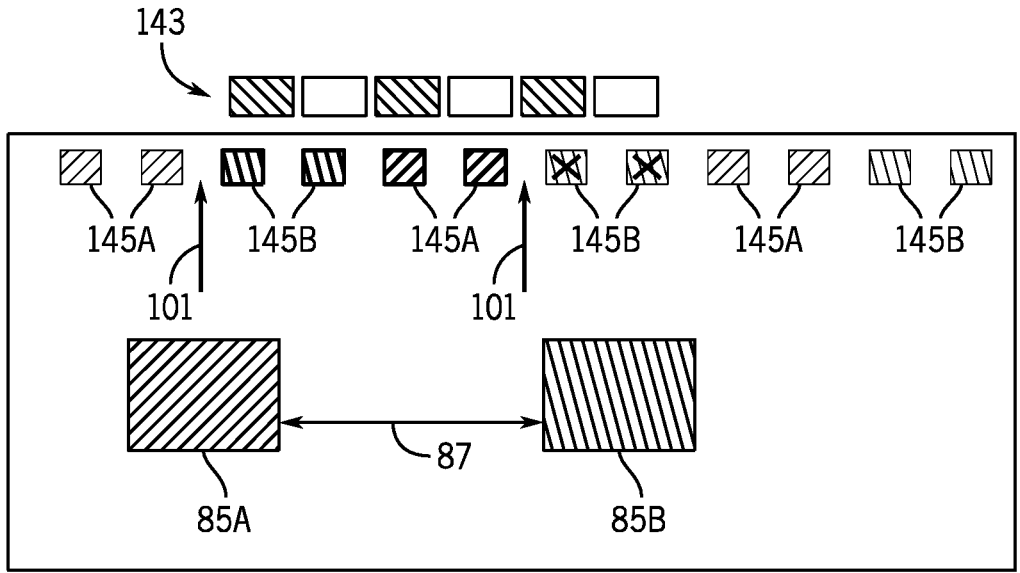
FIG. 18 is a block diagram representation of edge detection shown in FIG. 17 when at least one of the position sensors has failed.

With reference next to FIG. 18, edge detection may be utilized to identify a failed position sensor 145. According to the illustrated embodiment, the magnet array 143 has a length sufficient to span three pairs of position sensors. Two of the position sensors under the magnet array 143 are illustrated as having failed The edge 101 of each mover is identified as described above. A length for the mover 100 is then determined as a function of the position of both edges which were detected. Both the first and second processing cores 85A, 85B may determine a difference in the distance between the positions of the edges to initially determine a length of the magnet array 143. Positioning of the magnet array 143 on the mover 100 is known. For example, a front and rear overhang length may be stored defining a distance between each edge of the magnet array 143 and the edge of the mover 100. Optionally, a length of the mover, a length of the magnet array, and a positioning offset of the magnet array from center or from one edge of the mover may be stored. The length of the magnet array 143 and the positioning information may be used to determine a length of the mover 100. A known value for the length of the mover 100 may be stored in memory 54 of the segment controller. If each position sensor 145 is operating properly, the processing cores 85 determine the correct length for the mover and the determined length will match the stored length. Each processing core 85 may compare the known length stored in memory to the value of the length determined by each processing core. If the determined value is different than the stored value, the processing cores 85 identify one of the position sensors 145 as having failed.

Figures 19, 20:
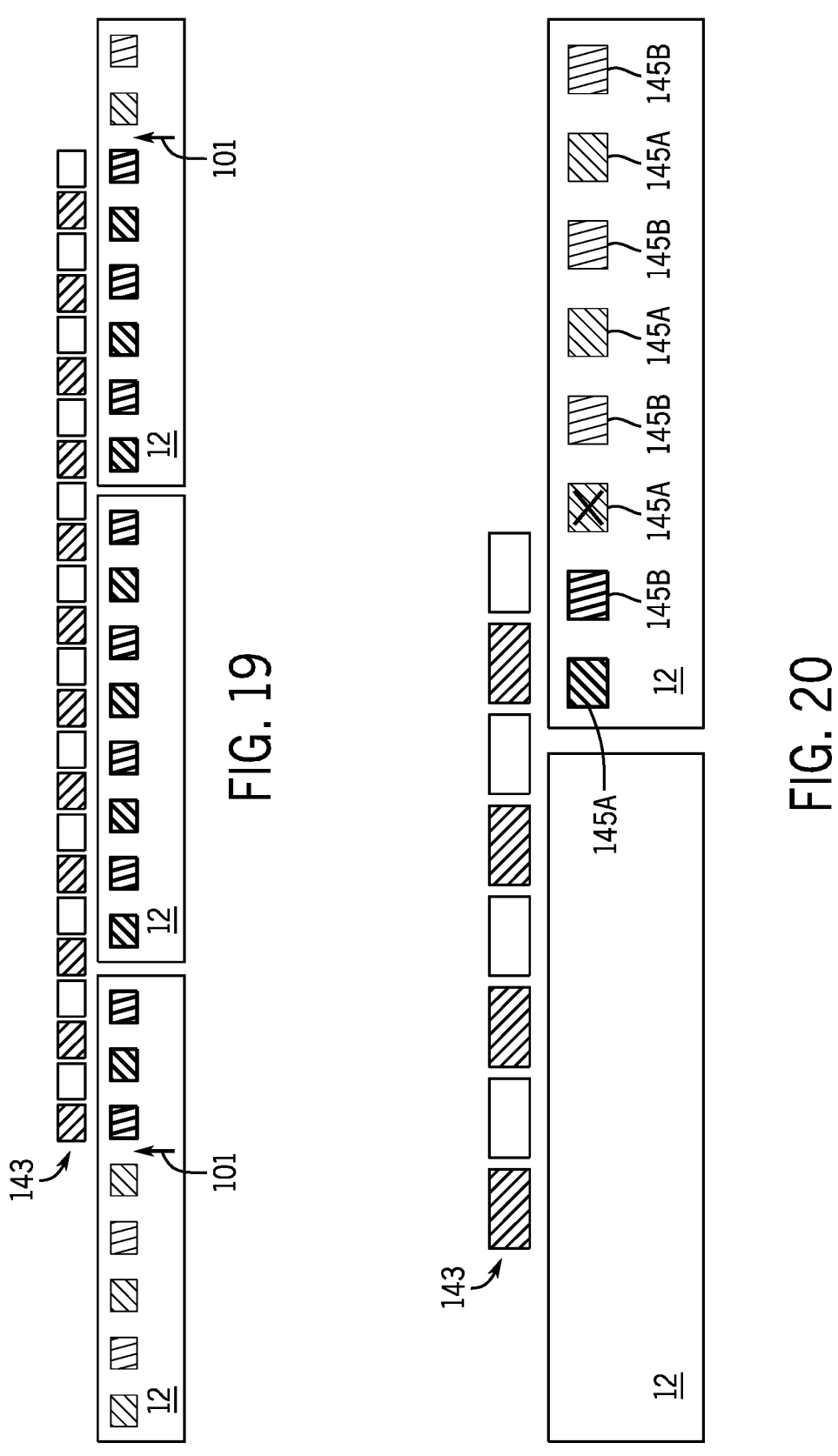
FIG. 19 is a block diagram representation of edge detection shown in FIG. 17 spanning multiple track segments.
FIG. 20 is a block diagram representation of detecting position with the safety control system of FIG. 9 as a mover enters a safety zone.

Turning next to FIG. 19, the potential exists for the magnet array 143 to be longer than a track segment 12. As discussed above, the mover 100 may have a length in the range of meters for certain applications. A track segment 12 may have a standard length of one meter. In these applications, a segment controller 50 may need to communicate with another segment controller 50 which is spaced apart from the first segment controller 50 by one or more track segments 12. The segment controller 50 for each track segment 12 on which an edge 101 is present is able to identify the location of the edge. The segment controller 50 may pass the position of the edge to an adjacent segment controller 50. If, however, no edge was detected on the adjacent segment controller 50, the adjacent segment controller may continue passing the position of an edge to the next adjacent segment controller 50 until the position of one edge 101 reaches a segment controller 50 that has determined the other edge. The length of the mover 100 will be determined by finding the difference in position between detected edges 101, but the edges 101 are detected by different segment controllers 50. A failed position sensor 145 may be detected when the length of the mover 100 does not match a stored value for the length of the mover 100. In addition, a failed position sensor 145 may be determined on any track segment 12 in which the magnet array 143 completely spans the track segment 12. Every position sensor 145 on the track segment should be active when a magnet array 143 completely spans the track segment 12. If any position sensor 145 is not active when the magnet array 143 completely spans the track segment 12, the segment controller 50 for that track segment may identify the inactive position sensor 145 as failed.

Turning next to FIG. 20, a potential for missing a failed position sensor may exist when entering a safety zone. The illustrated embodiment indicates that the mover is entering a safety zone from a non-safety zone. The track segment 12 to the left in the drawing would still include position sensors for controlling operation of the mover, but the application does not require operation at a desired safety level along that track segment. As a mover enters an area requiring operation at a desired safety level, one of the embodiments of the present invention, as discussed above, are implemented to provide integrity in determining the position of each mover. A failure in an initial position sensor 145, such as that shown in FIG. 20, may go unreported until the mover 100 has completely entered the safety zone and both edges 101 of the mover 100 may be detected. Alternately, a combination of the embodiments discussed above may be utilized. For example, the first track segment 12 in the safety zone, may utilized the fully redundant system shown in FIG. 16. In this manner, a failure of one of the position sensors 145 will always be detectable. Once the mover 100 is fully within the safety zone, the alternating assignment of position sensors 145 to first and second position sensors 145 may be utilized.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. An apparatus for detecting integrity of a position for a mover in an independent cart system, the apparatus comprising:

a magnet array mounted on the mover;

a track having a plurality of track segments, wherein each of the plurality of track segments comprises:

a plurality of first position sensors configured to detect the magnet array mounted on the mover and to generate a first position feedback signal corresponding to the position of the mover, a plurality of second position sensors configured to detect the magnet array mounted on the mover and to generate a second position feedback signal corresponding to the position of the mover;

a first processing core configured to:

receive the first position feedback signal from each of the plurality of first position sensors, and generate a first value of the position of the mover along a track segment on which the mover is located as a function of the first position feedback signals; and a second processing core configured to:

receive the second position feedback signal from each of the plurality of second position sensors, and generate a second value of the position of the mover along the track segment on which the mover is located as a function of the second position feedback signals, wherein the first processing core is in communication with the second processing core and wherein at least one of the first and the second processing cores is configured to compare the first value and the second value of the position of the mover to verify operation of the plurality of first and second position sensors.

2. The apparatus of claim 1, wherein:

each of the plurality of first position sensors are positioned in pairs along each of the track segments, one of the plurality of first position sensors in each pair is configured to generate a sine wave signal corresponding to the mover travelling past, one of the plurality of first position sensors in each pair is configured to generate a cosine wave signal corresponding to the mover travelling past, each of the plurality of second position sensors are positioned in pairs along each of the track segments, one of the plurality of second position sensors in each pair is configured to generate a sine wave signal corresponding to the mover travelling past, and one of the plurality of second position sensors in each pair is configured to generate a cosine wave signal corresponding to the mover travelling past.

3. The apparatus of claim 1, wherein the plurality of first position sensors and the plurality of second position sensors are each configured to generate both a sine wave signal and a cosine wave signal corresponding to the mover travelling past.

4. The apparatus of claim 1, wherein the plurality of first position sensors are positioned along each of the track segments in an alternating configuration with the plurality of second position sensors.

5. The apparatus of claim 1, wherein the plurality of first position sensors are positioned along a first half of each track segment and the plurality of second position sensors are positioned along a second half of each track segment.

6. The apparatus of claim 5, further comprising a safety rated communication channel between adjacent track segments, wherein a first track segment communicates either the second position feedback signal from each of the plurality of second position sensors or a safety rated position determined as a function of the second position feedback signal from each of the plurality of second position sensors to a second track segment adjacent to the first track segment.

7. The apparatus of claim 1, wherein each of the plurality of track segments further comprises:

a plurality of third position sensors configured to detect the magnet array mounted on the mover and to generate a third position feedback signal corresponding to the position of the mover; and a third processing core configured to:

receive the third position feedback signal from each of the plurality of third position sensors, and generate a third value of the position of the mover along the track segment on which the mover is located as a function of the third position feedback signals, wherein at least one of the first processing core, the second processing core, and the third processing core determine the position of the mover as a function of the first value, the second value, and the third value of the position.

8. The apparatus of claim 1, wherein at least one of the first processing core and the second processing core is further configured to identify an absolute position of the mover along the track by detecting a first edge and a second edge of the mover along the track for the independent cart system.

9. A method for detecting integrity of a position for a mover in an independent cart system, wherein a magnet array is mounted on the mover and the independent cart system includes a track having a plurality of track segments, the method comprising the steps of:

receiving a plurality of first position feedback signals at a first processing core for a track segment, wherein each of the plurality of first position feedback signals is generated by a first position sensor mounted on the track segment and configured to detect the magnet array mounted on the mover;

receiving a plurality of second position feedback signals at a second processing core for the track segment, wherein each of the plurality of second position feedback signals is generated by a second position sensor mounted on the track segment and configured to detect the magnet array mounted on the mover;

generating a first value of the position of the mover along the track segment with the first processing core responsive to receiving the plurality of first position feedback signals;

generating a second value of the position of the mover along the track segment with the second processing core responsive to receiving the plurality of second position feedback signals; and comparing the first value to the second value of the position of the mover with either the first processing core or the second processing core to verify operation of each of the first position sensors and the second position sensors.

10. The method of claim 9, wherein:

each of the plurality of first position sensors are positioned in pairs along the track segment, each of the plurality of second position sensors are positioned in pairs along the track segment, the pairs of first position sensors are alternately positioned along the track with the pairs of second position sensors, and the method further comprises the steps of:

generating a sine wave signal corresponding to the mover travelling along the track with one of the first position sensors in each pair;

generating a cosine wave signal corresponding to the mover travelling along the track with one of the first position sensors in each pair;

generating a sine wave signal corresponding to the mover travelling along the track with one of the second position sensors in each pair; and generating a cosine wave signal corresponding to the mover travelling along the track with one of the second position sensors in each pair.

11. The method of claim 9 further comprising the steps of:

generating a sine wave signal and a cosine wave signal corresponding to the mover travelling along the track with each of the plurality of first position sensors; and generating a sine wave signal and a cosine wave signal corresponding to the mover travelling along the track with each of the plurality of second position sensors.

12. The method of claim 9, wherein the plurality of first position sensors are positioned along the track segment in an alternating configuration with the plurality of second position sensors.

13. The method of claim 9, wherein the plurality of first position sensors are positioned along a first half of the track segment and the plurality of second position sensors are positioned along a second half of the track segment.

14. The method of claim 13 further comprising the step of communicating position information between adjacent track segments on a safety rated communication channel, wherein the position information includes either the first or second position feedback signals from the first half or the second half of an adjacent track segment or a safety rated position determined on the adjacent track segment.

15. The method of claim 9, further comprising the steps of:

receiving a plurality of third position feedback signals at a third processing core for the track segment, wherein each of the plurality of third position feedback signals is generated by a third position sensor mounted on the track segment and configured to detect the magnet array mounted on the mover;

generating a third value of the position of the mover along the track segment with the third processing core responsive to receiving the plurality of third feedback signals; and determining the position of the mover along the track segment as a function of the first value, the second value, and the third value of the position of the mover.

16. The method of claim 9, further comprising the steps of:

detecting a first edge and a second edge of the mover along the track for the independent cart system with at least one of the first processing core and the second processing core; and identifying an absolute position of the mover along the track as a function of the first edge and the second edge.

17. A method for detecting integrity of a position for a mover in an independent cart system, wherein a magnet array is mounted on the mover and the independent cart system includes a track having a plurality of track segments, the method comprising the steps of:

receiving a plurality of first position feedback signals at a first processing core for a track segment, wherein the plurality of first position feedback signals are generated by a plurality of first position sensors mounted on the track segment to detect the magnet array and the plurality of first position feedback signals includes paired sine wave and cosine wave signals;

receiving a plurality of second position feedback signals at a second processing core for the track segment, wherein the plurality of second position feedback signals are generated by a plurality of second position sensors mounted on the track segment to detect the magnet array and the plurality of second position feedback signals includes paired sine wave and cosine wave signals;

detecting a first edge of the mover by identifying either the first position feedback signals or the second position feedback signals having an inactive value at a first position along a track for the independent cart system and either the first position feedback signals or the second position adjacent the first position having an active value;

detecting a second edge of the mover by identifying either the first position feedback signals or the second position feedback signals having an inactive value at a second position along a track for the independent cart system and either the first position feedback signals or the second position adjacent the second position having an active value;

determining a length of the mover magnet array by either the first processing core or the second processing core as a function of the first position and the second position; and comparing the length of the mover magnet array determined by either the first processing core or the second processing core to a predefined length stored in a memory for either the first processing core or the second processing core to verify operation of the first position feedback signals and the second position feedback signals.

18. The method of claim 17 wherein:

each of the plurality of track segments includes a segment controller, the segment controller in each of the plurality of track segments include the first processing core and the second processing core, the method further comprises the step of communicating either the first position or the second position between a first track segment and a second track segment.

19. The method of claim 18, wherein:

each of the plurality of track segments has a first length; and the length of the mover magnet array is greater than one half of the first length.

20. The method of claim 19 wherein:

the step of detecting the first position of the first edge of the mover occurs on the first track segment;

the step of detecting the second position of the second edge of the mover occurs on the second track segment;

the step of determining the length of the mover magnet array further comprises the steps of:

receiving the second position at the segment controller in the first track segment from the segment controller in the second track segment, receiving the first position at the segment controller in the second track segment from the segment controller in the first track segment, and determining the length of the mover magnet array in the segment controllers for both the first and second track segments as a function of the first and second positions.

* * * * *